(12) United States Patent
Seamon et al.

(10) Patent No.: US 8,412,419 B1
(45) Date of Patent: Apr. 2, 2013

(54) SYSTEM FOR MAPPING GIS LAYERS

(75) Inventors: Steve Seamon, Oakland, TN (US); Derek Emerine, Benton, MO (US); Christopher Givens, Hernando, MS (US); Subbarao Yarlagadda, Collierville, TN (US); Brian Montgomery, Starkville, MS (US)

(73) Assignee: Helena Chemical Company, Collierville, TN (US)

( * ) Notice: Subject to any disclaimer, the term of this patent is extended or adjusted under 35 U.S.C. 154(b) by 479 days.

(21) Appl. No.: 12/561,903

(22) Filed: Sep. 17, 2009

(51) Int. Cl.
*G06F 7/70* (2006.01)

(52) U.S. Cl. .............................. 701/50; 700/283; 702/5

(58) Field of Classification Search .................. 701/50; 700/283, 284; 702/5
See application file for complete search history.

(56) References Cited

U.S. PATENT DOCUMENTS

| | | | | |
|---|---|---|---|---|
| 2,503,932 | A * | 4/1950 | Barbey .......................... | 708/803 |
| 4,992,942 | A | 2/1991 | Bauerle et al. | |
| 5,033,397 | A | 7/1991 | Colburn, Jr. | |
| 5,220,876 | A | 6/1993 | Monson et al. | |
| 5,246,164 | A | 9/1993 | McCann et al. | |
| 5,309,374 | A * | 5/1994 | Misra et al. ..................... | 702/81 |
| 5,422,831 | A * | 6/1995 | Misra et al. ..................... | 702/81 |
| 5,668,719 | A | 9/1997 | Bobrov et al. | |
| 5,673,637 | A | 10/1997 | Colburn, Jr. et al. | |
| 5,740,038 | A | 4/1998 | Hergert | |
| 5,771,169 | A | 6/1998 | Wendte | |
| 5,870,689 | A | 2/1999 | Hale et al. | |
| 5,878,371 | A | 3/1999 | Hale et al. | |
| 5,884,224 | A | 3/1999 | McNabb et al. | |
| 5,887,491 | A | 3/1999 | Monson et al. | |
| 5,902,343 | A | 5/1999 | Hale et al. | |
| 5,913,915 | A | 6/1999 | McQuinn | |
| 5,927,603 | A | 7/1999 | McNabb | |
| 5,938,709 | A | 8/1999 | Hale et al. | |
| 5,961,573 | A | 10/1999 | Hale et al. | |
| 5,978,723 | A | 11/1999 | Hale et al. | |
| 5,991,687 | A | 11/1999 | Hale et al. | |
| 5,995,894 | A | 11/1999 | Wendte | |
| 6,016,713 | A | 1/2000 | Hale | |
| 6,029,106 | A | 2/2000 | Hale | |
| 6,044,324 | A | 3/2000 | Boerhave et al. | |
| 6,058,351 | A | 5/2000 | McCauley | |
| 6,061,618 | A | 5/2000 | Hale et al. | |
| 6,119,069 | A | 9/2000 | McCauley | |
| 6,236,907 | B1 | 5/2001 | Hauwiller et al. | |
| 6,266,432 | B1 | 7/2001 | Wiens | |
| 6,285,190 | B1 * | 9/2001 | Brune et al. ................... | 324/326 |
| 6,356,830 | B1 | 3/2002 | Adamchuk et al. | |
| 6,525,276 | B1 | 2/2003 | Vellidus et al. | |
| 6,549,852 | B2 | 4/2003 | Hanson | |
| 6,606,542 | B2 | 8/2003 | Hauwiller et al. | |
| 6,646,264 | B1 * | 11/2003 | Modiano et al. ......... | 250/339.07 |
| 6,698,368 | B2 | 3/2004 | Cresswell | |

(Continued)

*Primary Examiner* — Helal A Algahaim

(57) ABSTRACT

A system obtains agricultural attribute data from the field. The agricultural attribute data is classified into a plurality of spatially distributed regions across the field. Samples are obtained to provide a second set of agricultural attribute data. A subset of the second set of agricultural attribute data is associated, by georeferencing, with one class of the spatially distributed regions. The subset is subclassified into respective zones, as may be done by interpolation to define contours. The classification process operates without regard to data that is not in the subset but is also taken from the second set of agricultural attribute data, i.e., the subclassification ignores data in the second set that is georeferenced to classes other than the class associated with the subset. The subclassification is repeated for all classes. An agroproduct prescription map is prepared for the application of agroproducts to the respective zones.

16 Claims, 4 Drawing Sheets

U.S. PATENT DOCUMENTS

| | | |
|---|---|---|
| 6,745,128 B2 | 6/2004 | Hanson |
| 6,756,783 B2 * | 6/2004 | Brune et al. .................. 324/326 |
| 6,792,882 B2 | 9/2004 | Aspelin et al. |
| 6,889,620 B2 | 5/2005 | Fraisse et al. |
| 6,937,939 B1 | 8/2005 | Shibusawa et al. |
| 6,999,877 B1 | 2/2006 | Dyer et al. |
| 7,015,697 B2 * | 3/2006 | Brune et al. .................. 324/326 |
| 7,171,912 B2 | 2/2007 | Fraisse et al. |
| 7,317,988 B2 | 1/2008 | Johnson |
| 7,327,144 B2 * | 2/2008 | Brune et al. .................. 324/326 |
| 7,343,867 B2 | 3/2008 | Fraisse et al. |
| 7,548,065 B2 * | 6/2009 | Brune et al. .................. 324/326 |
| 7,728,595 B2 * | 6/2010 | Brune et al. .................. 324/326 |
| 7,990,150 B2 * | 8/2011 | Brune et al. .................. 324/326 |
| 2001/0048755 A1 | 12/2001 | Weins |
| 2002/0022929 A1 | 2/2002 | Ell |
| 2002/0035431 A1 | 3/2002 | Ell |
| 2002/0040273 A1 | 4/2002 | John et al. |
| 2002/0040300 A1 | 4/2002 | Ell |
| 2002/0099472 A1 | 7/2002 | Benneweis |
| 2002/0105331 A1 * | 8/2002 | Brune et al. .................. 324/326 |
| 2003/0018431 A1 | 1/2003 | Hanson |
| 2003/0019408 A1 | 1/2003 | Fraisse et al. |
| 2003/0036852 A1 | 2/2003 | Ell et al. |
| 2003/0125877 A1 | 7/2003 | Hanson |
| 2003/0201126 A1 * | 10/2003 | Brune et al. .................... 175/45 |
| 2003/0208319 A1 | 11/2003 | Ell et al. |
| 2004/0034450 A1 | 2/2004 | Seal et al. |
| 2004/0189305 A1 * | 9/2004 | Brune et al. .................. 324/326 |
| 2004/0231239 A1 | 11/2004 | Raun et al. |
| 2004/0237394 A1 | 12/2004 | Mayfield et al. |
| 2005/0149235 A1 | 7/2005 | Seal et al. |
| 2005/0150160 A1 | 7/2005 | Norgaard et al. |
| 2005/0165552 A1 | 7/2005 | Fraisse et al. |
| 2006/0030990 A1 | 2/2006 | Anderson et al. |
| 2006/0087447 A1 * | 4/2006 | Brune et al. ............... 340/853.3 |
| 2006/0282228 A1 | 12/2006 | Avey et al. |
| 2007/0156318 A1 | 7/2007 | Anderson et al. |
| 2007/0186830 A1 | 8/2007 | Fraisse et al. |
| 2008/0111552 A1 * | 5/2008 | Brune et al. .................. 324/326 |
| 2008/0253618 A1 | 10/2008 | Hendrickson et al. |
| 2009/0164281 A1 | 6/2009 | Norgaard et al. |
| 2009/0212777 A1 * | 8/2009 | Brune et al. .................. 324/326 |
| 2010/0201366 A1 * | 8/2010 | Brune et al. .................. 324/326 |
| 2011/0267064 A1 * | 11/2011 | Brune et al. .................. 324/326 |

* cited by examiner

SYSTEM FOR MAPPING GIS LAYERS

FIELD OF THE DISCLOSURE

The present document describes methods and apparatus for classifying agricultural attribute data used in geographical information systems (GIS). The data may be presented in various layers of a map to facilitate the informed delivery of agroproducts, such as fertilizers, pesticides, seed, and the like, at a variable rate across the surface of a farmer's field.

BACKGROUND

As used herein, the term "agroproduct" is defined to include anything that may be physically applied to a farmer's field. This may include, by way of example, fertilizers, pesticides, manure, any type of soil amendment, nutrients, water, polymers, compost, soil fumigants, pH adjusters, and seeds. Purchasing and applying these agroproducts is one of the major expenses of modern farming.

Farmers traditionally apply agroproducts at blanket application rates. Recent advances in precision agriculture technologies recognize that the application of agroproducts should not be done so blindly. For example, the addition of chemicals to soil may be overdone as well as underdone where the application of one material to the soil may cause an imbalance in other materials, such that curing one deficiency causes a problem in another soil property. This is shown where adding some lime to soil may raise an acidic soil's pH to an optimum range for a given crop and increase crop yields, but adding too much lime can raise the pH beyond the optimum range and result in decreased yield. Similarly, while application of key nutrients like fixed nitrogen and phosphate to soil deficient in those nutrients often increases crop yield, application of excessive amounts of those nutrients is wasteful and expensive. The excess nutrients may leach out of the soil to cause pollution issues in creeks, rivers, and lakes downstream. It is therefore desirable to avoid blanket application of chemicals by applying only a necessary amount of each chemical to the soil. Variable rate application of agroproducts may optimize crop yields while minimizing the use of agroproducts.

In order to determine a necessary amount of each agroproduct to apply to soil, farmers may pull soil samples for analysis on commercial order. A laboratory may quantitatively analyze the soil samples to determine existing soil nutrient content, pH, and other conditions. The soil nutrient content, pH, and conditions are compared to optima for a crop grown in the field. This information is used to determine an appropriate combination of agroproducts to be applied. Sampling need not be limited to soil samples, where other sampling techniques include, for example, plant tissue samples or insect counts to facilitate the informed delivery of agroproducts.

Modern farms may be quite large. An individual field is often a mile or more across. As such, soil nutrient content, pH, available water, and other conditions may vary significantly from one part of the field to another. These variations may result from differences in underlying strata intersecting the surface, from areas subjected to flooding from nearby streams and rivers now or in the past, from differences in elevation that cause water to flow preferentially to some portions and away from others, from variations in chemical application history between portions formerly owned by different owners, from differences in runoff received from neighboring fields, and for many other reasons.

Plants do not care about history, legal property lines or field boundaries. Each crop plant in a field is sensitive to nutrients, pH, and other attributes of its own root zone—not to conditions hundreds of feet or a mile away whether or not in the same field. Given the size of modern fields, it is desirable to map soil nutrients, pH, and other conditions across the field, and to vary the mix and quantity of chemicals applied to different portions of the field according to the nutrients, pH, and other conditions present in each portion of the field.

There is a cost, however, associated with sampling and associated analysis. By way of example, it is typically not practical to perform enough chemical analyses of enough samples to directly map nutrient content, and pH, across an entire large, modern, farmer's field, especially when the properties under study may change from year to year. For these reasons it is problematic in the art that variable application rates are, practically speaking, too often indeterminable.

SUMMARY

A system according to the instrumentalities described herein overcomes the foregoing problems and advances the art through the use of a georeferenced mapping technology that classifies agricultural attribute data for relation to variable application rates of agroproducts. The system may be used to project an optimized yield, which is frequently assumed to optimize also profit. In other aspects, the system may be used to project an optimized profit that does not necessarily optimize yield, and this is done considering also the cost of agroproducts that are projected to provide an incremental amount of increased yield.

In one embodiment, the system utilizes a methodology that includes obtaining a first set of agricultural attribute data from a field. The agricultural attribute data may represent anything about the field, such as soil characteristics or nutrient content, pH, chemical exchange capacity, clay content, soil electrical conductivity data, spectroscopic data, insect counts, and/or soil sample information. The first set of agricultural attribute data is classified to identify a plurality of classes assigned to spatially distributed regions. These regions may be each be defined by the contiguous elements of a grid each having the same classification. A second set of agricultural attribute data is also obtained. A subset of this second set of agricultural attribute data may be identified, for example, by georeferencing to a single class selected from among the plurality of classes. This subset may be classified without regard to data obtained from other classes to identify a plurality of application zones within the single class. It is then possible to prescribe the application of agroproducts for the respective zones.

One useful technique for the act of 'classifying' as described above, among other useful techniques, is a Jenks natural-breaks classification. In an embodiment, this classification proceeds using agricultural attribute data that represents soil type to define the plurality of regions. Samples may then be taken from the respective regions, such as plant tissue samples, insect counts, or soil samples. Data from these samples may then be used in the act of 'subclassifying' as described above. One useful technique for the act of subclassifying, among other useful techniques, is that of Kriging Interpolation. prescription map is determined according to needs of each zone, and agroproducts may be applied on the basis of this map.

DETAILED DESCRIPTION OF THE EMBODIMENTS

The following discussion teaches by way of example and not by limitation. The instrumentalities described herein may be implemented on a machine that combines circuitry with program instructions in the form of software, such as on a personal computer. Telecommunications circuitry may be added for network implementations, such as implementations using the Internet where the system may reside on a server, whether at a client level or that of an Internet Service Provider. Processing and databasing may be performed at single sites, or distributed throughout various sites on a network.

Mapping Agricultural Attributes of a Field

Figure 1:
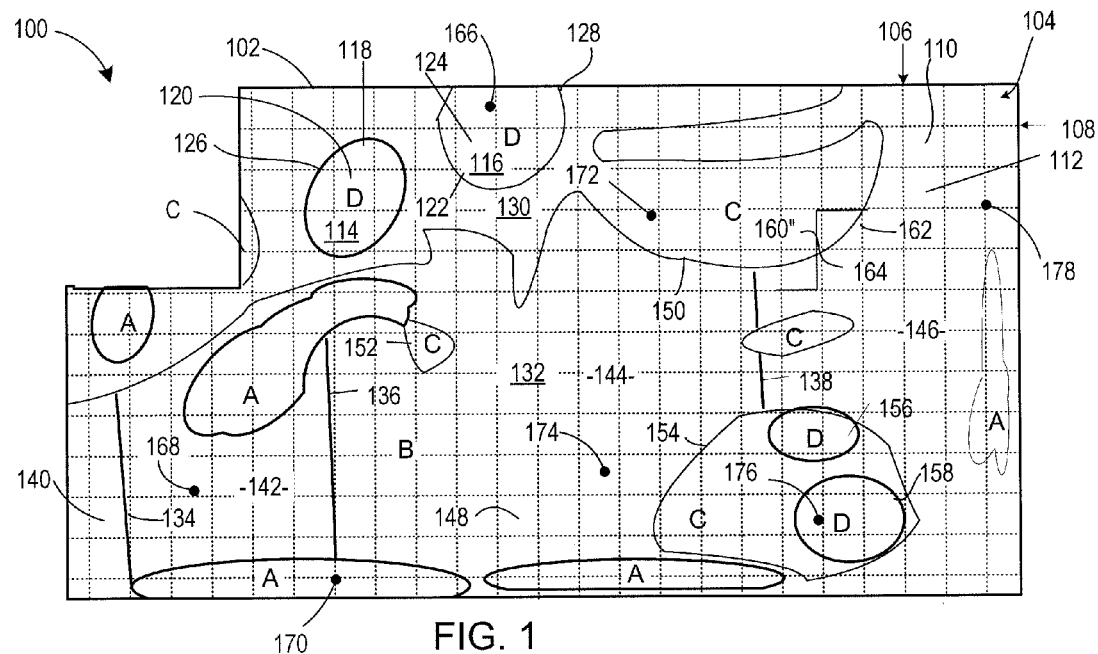
FIG. 1 shows a map of a farmer's field with classification and subclassification of agricultural attribute data.

FIG. 1 shows a map 100 of a farmer's field defined by a field boundary 102. As shown in FIG. 1, map 100 appears as an image that classifies and subclassifies various attributes of the farmer's field. Although presented as an image in FIG. 1, it will appreciate that the map 100 may be any representation that relates the attributes to the surface area within field boundary 102. This representation may be stored as a map, for example, in a computer memory without necessarily ever producing an image.

A grid 104 results from a plurality of column/row lines, such as lines 106, 108, forming grid elements 110, 112. The grid elements, such as grid elements 110, 112 cover the surface of map 100 and are associated with a first type of agricultural data. This first type of agricultural data may be any data that is useful for classifying the grid elements, for example, by associating the grid elements into classifications A, B, C, and D. The classification may proceed by any mathematical technique that is suitable for classification. This may be done using statistical techniques, such as range stratification to place approximately equal numbers of data points into an arbitrarily predetermined number of ranges. In an embodiment, a technique for classifying the first type of agricultural data is known as Jenks Optimization. Other classification methods may also be used, for example, classification techniques known as equal interval, unique values, and equal values. After classification, the grid elements according to a particular class may be grouped into respective regions formed of contiguous grid elements where, for example, regions 114 and 116 are separate regions formed of contiguous grid elements each having a classification D. By way of example, region 114 contains contiguous grid elements 118, 120, while region 116 contains contiguous grid elements 122, 124. Lines 126, 128 bound the respective regions 114, 116, separating the respective grid elements of classification D in regions 114, 116 from those of classification C in region 130.

The various regions of map 100 may be subclassified into zones. This is shown by way of example where region 132 has classification B. Contour lines 134, 136, 138 allocate the various grid elements of region 132 into subclasses 140, 142, 144, 146. Thus, by way of example, the grid elements such as grid element 148 of region 132 are subclassified by association with a second type of agricultural data. In this manner, it is possible to subclassify a single classification without regard to data taken from the locus of other classifications. Accordingly, the respective subclasses 140, 142, 144, 146 identify areas of the farmer's field according to map 100 where a prescription for delivery of agroproducts may address a need, as indicated by the data associated with the respective subclasses. For purposes of clarity, it will be appreciated that the respective subclasses 140, 142, 144, 146 may be unique or the same, such that subclass 140 may have the same subclassification as does subclassification 144 such that only the locations of the subclassifications 140, 144 differ and the subclassifications receive the same prescription Alternatively, the subclassification of region 140 may differ from the subclassification of subclass 144, so that the regions 140, 144 are to receive different prescriptions.

The subclassification may proceed by any mathematical technique that is suitable for classification. This may be done using statistical techniques, such as range stratification to place approximately equal numbers of data points into an arbitrarily predetermined number of ranges. A particularly preferred technique for subclassifying the second type of agricultural data is known as Kriging Interpolation.

Line 150 separates region 130 of classification C from region 132 of classification B. Other regions 152, 154 exist of classification C. Regions 156, 158 of classification D are surrounded by region 154, but are not part of region 154. The regions 130, 152, 154 of classification C may be subclassified without regard to data taken from the locus of any other classification.

Figure 5:
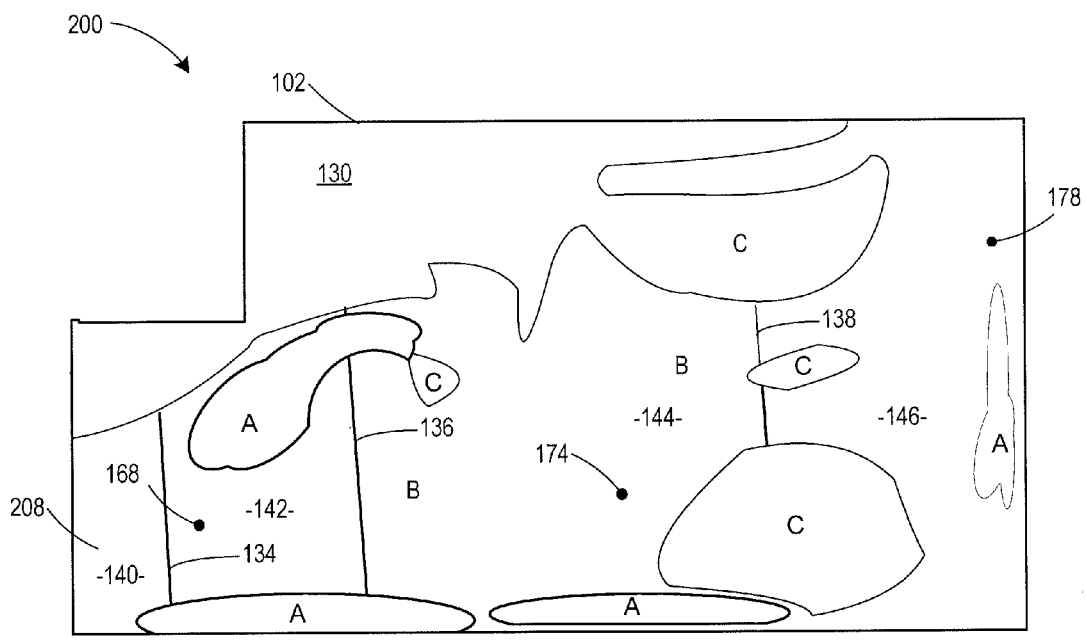
FIG. 5 illustrates three samples in a single class for interpolation of nutrient values in that class by Kriging.

The features shown in FIG. 1 may be presented in various layers, for example, where the grid 110 is presented as a layer that may be turned on or off for purposes of the presentation. See FIG. 5 for a comparison view with grid 110 turned off. FIG. 1 may also relate various features to one another using conventional GIS process technologies that are known as relational vector data or raster data. The smoothness of line 150 generally indicates a boundary that defines a data relationship by vector processing. Alternatively, if the boundary were processed by raster technique it would appear as a blocky line 160 defining the boundary at the juncture of grid elements 162, 164. The selection of vector or raster process is a matter of design choice.

In one example, it is possible for the first type of agricultural data to represent soil type, and the second type of agricultural data to represent a soil characteristic. Thus, the soil type may be indirectly assessed on the basis of an array of data for soil electrical conductivity measurements, infrared measurements, or crop yield. A selected array of these values may be classified by Jenks Optimization as the first type of agricultural data to arrive at the respective classifications A, B, C, D. Alternatively, data from the respective arrays may be processed in combination, such as by multiplication with weighting factors that best associate the combined values with a particular soil type. This may be done on the basis of empirical correlation or by the use of a naturally intelligent algorithm, such as a neural network or adaptive filter that is trained for this purpose. The second type of agricultural data may represent an attribute of the soil that has been quantitatively measured in a soil sample and which may be treated by amendment to the soil, such as pH may be treated by the amendment of lime. Thus, samples may be taken for quantitative analysis at locations 166, 168, 170, 172, 174, 176, 178.

Alternatively, the second type of agricultural data may be crop data, such as data taken from plant tissue samples or an insect count that may be treated by the application of a pesticide. The respective grid elements, such as grid elements 110, 112, 148, may be associated with a color dimension (not shown) to indicate the applicable prescription.

Figure 2:
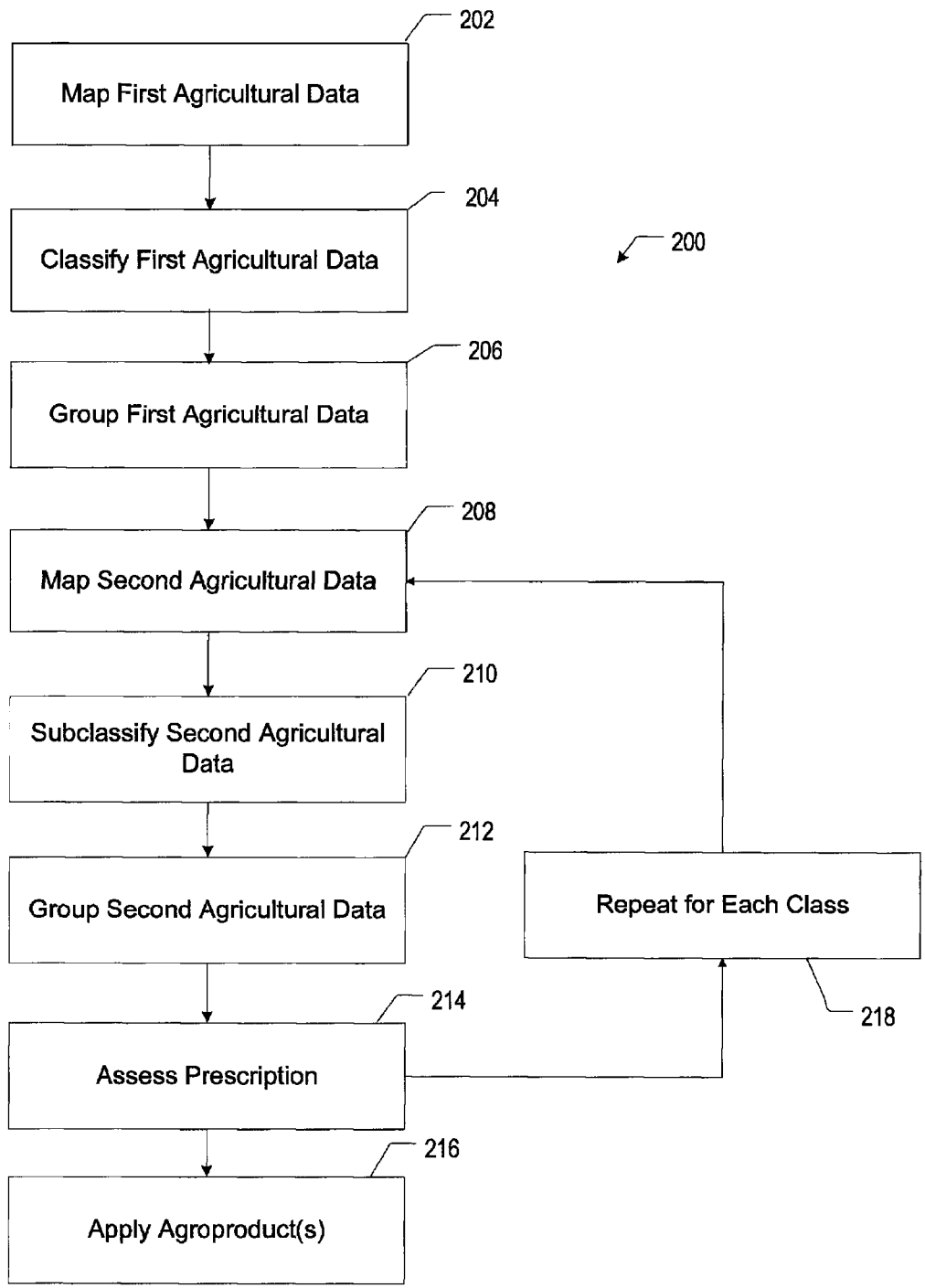
FIG. 2 is a flowchart of a method for determining an agroproduct prescription map for a farmer's field, and for applying agroproducts to the field. is an example of a classified map of a field.

FIG. 2 shows a method 200 of drawing map 100. In this discussion, 100-series numerals reference FIG. 1 and 200-series numerals reference FIG. 2. Method 200 begins with the mapping 202 of an array of a first type of agricultural data and association of this data to a grid, such as the elements 110, 112, 148 of grid 104. Any such data will suffice. In various embodiments, the first type of agricultural data may represent soil or crop characteristics, and may exist in the form of soil electrical conductivity data, infrared measurements, data obtained from plant tissue samples, data obtained from soil samples, crop yield data, insect counts, or any other data. In one example, a tractor may be used to obtain soil electrical conductivity data at intervals which are more closely spaced than the grid elements 110, 112, 148. This data may, for example, be averaged according to multiple points falling within a single grid element, and the average value may be associated with the grid element. If the agricultural data is obtained at intervals less frequent than the respective grid elements, then the first agricultural data may be interpolated for assignment to the respective grid elements. Alternatively, the data may be sparsely dispersed such that there are fewer data points than there are grid elements. In this latter instance, grid elements where there are no data points may be assigned values by interpolating from the actual data points.

The first agricultural data is next classified 204. The classification entails grouping of similar values bounded by range into respective classifications. Ideally, the first agricultural data will be naturally distributed into different modes or peaks, or the data will demonstrate a natural stratification or natural breaks that assist the classification effort. If not, the classification scheme may impose an arbitrary order, such as by dividing the population into groups of substantially equal numbers of data points. This forms the basis for classification into classes A, B, C, D, as shown in FIG. 1. As mentioned previously, a Jenks Optimization method may be used to classify the data.

Once the respective grid elements 110, 112, 148 are classified, they may be grouped 206. The grouping may identify respective bodies or regions of contiguous grid elements, such as regions 114, 116, 152, 154.

An array of a second type of agricultural data is next mapped 208. This step may entail locating samples at locations for a particular class, such as samples at locations 168, 174, 178 for region 132 according to classification B. It is also an option at this time to spot calculation results on the various grid elements where, for example, it is possible to relate values by empirical correlations. In one example, there may exist infrared or other spectroscopic measurements over the entire surface defined by boundary 102. These measurements may be correlatable to measured values, such as yield, pH, soil cation exchange capacity, nitrogen content, potassium content, phosphorous content, clay content, etc. Then it is possible through the use of numerical techniques, such as by using a multivariate least squares polynomial regression, assign predictive values to individual grid elements, such as grid element 148, where no actual sample exists.

The second agricultural data is then subclassified 210. The subclassification preferably but optionally proceeds by subclassifying the second type of agricultural data for a particular class without regard to data obtained from locations in other classes. Thus, the subclassification by Kriging Interpolation may identify zones 142, 144, 146, in region B. It is also possible to subclassify on the basis of a single one of the zones, such as one of zones 140, 142, 144, 146, without regard to data obtained from any other zones. Alternatively, it is possible to subclassify by performing a Jenks Optimization on the second agricultural data. The subclassification may be performed using data from samples at locations 168, 174, 178 without regard to data from samples at locations 166, 170, 172, 176.

The subclassified grid elements are then placed in contiguous groups 212 to identify zones 140, 142, 144, 146. Each zone is assess prescription 214 for application of agroproducts according to the agricultural attributes for that particular zone, and there is the application of agroproduct 216 according to that prescription. There is repetition 218 of steps 208 through 214 for each of the classes determined in step 204.

Figure 3:
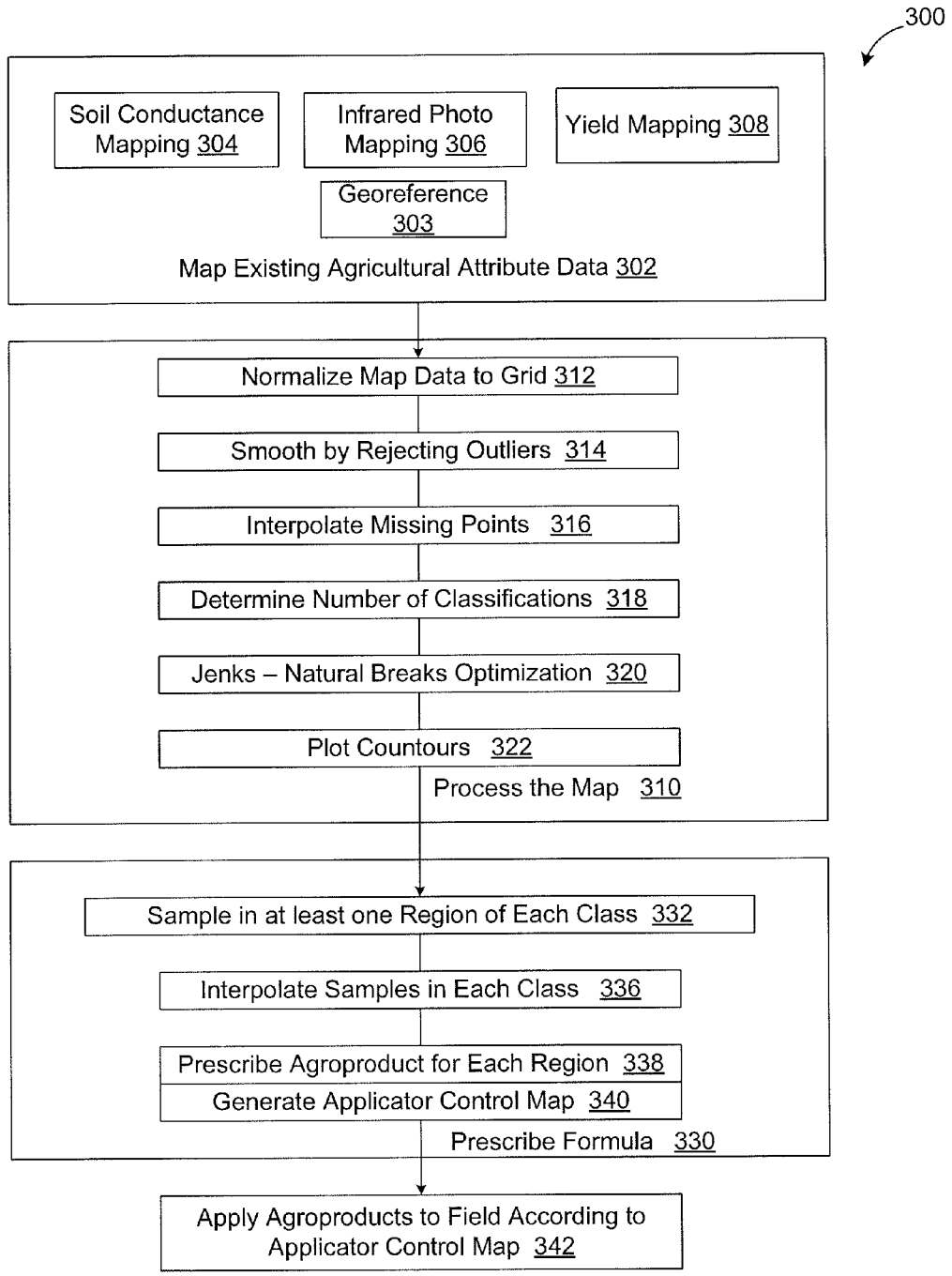
FIG. 3 is a flowchart of a method for determining an agroproduct prescription map for a farmer's field, and for applying agroproducts to the field

FIG. 3 shows an alternative method 300 of formulating a prescription map for a farmer's field. This type of map may be used to allocate variable rate application of agroproducts, such as fertilizers, pesticides, and the like. The method 300 may be implemented, for example, to produce maps as shown in FIG. 1 using program instructions on a system as shown schematically in FIG. 4. The method 300 begins with mapping agricultural attribute data 302 across the field. The agricultural attribute data may be any data associated with the field, such as data from plant tissue samples, insect counts, optical measurements, or data from quantitative soil analysis.

As is known in the art, the field boundary is georeferenced 303 to provide data representing the field boundary 102 (See FIG. 1). The georeferencing may be performed by digitizing the boundary 102 with use of an aerial photograph keyed to positional coordinate data from a Global Positioning System (GPS) receiver operating in differential mode to minimize location errors. Alternatively, the field boundary 102 may be traced using a series of GPS locations obtained, for example, by tracing the path of a vehicle driven along the boundary 102. The field boundary 102 defines a surface that may be considered a first mapping layer, although the designation 'first' is here a convenience for discussion recognizing that there may also be other preexisting layers, such as the aerial photograph. There exist a number of methods by which this initial mapping 302 of agricultural attribute data may be performed on this surface to provide. The general principle is to obtain measurements that indicate something about the field, such as soil or plant characteristics where these measurements are spatially located over the surface of the field.

Specific methods of mapping agricultural attribute data include, for example, soil electrical conductivity mapping 304. Soil electrical conductivity mapping entails obtaining soil electrical conductivity measurements with a tractor-towed measurement system 402 (See FIG. 4) similar to those offered by Veris Technologies, division of Geoprobe Systems, Salina, Kans. These systems combine a Global Positioning System (GPS) tracking system with a multiple-probe conductivity measurement system. The GPS system tracks coordinates of the tractor as it tows the measurement system across the field while periodically recording these coordinates in machine-readable form along with conductivity measurement data at specific points. The resulting coordinate—conductivity pairs form a map of agricultural attribute data across the field. This process provides map data that is particularly sensitive to differences in soil particle size, chemical exchange capacity (CEC), moisture content, clay content, and salinity.

A fast and low cost way to map agricultural attribute data is infrared photographic mapping 306. An infrared aerial photograph may be taken at a time when the field is relatively bare of crops. The image is taken with a digital camera 406, or with infrared film and digitized in a scanner, to provide a raw infrared map of agricultural attribute data in the field. Key landmarks, such as field boundaries and buildings for which GPS coordinates are known, may be located on the photograph to assist determination of reference coordinates, such that GPS coordinates can be determined for each pixel of the map.

Another method of indirectly mapping agricultural attribute data is yield mapping 308. Yield mapping is done by incrementing harvesting machinery 404 (See FIG. 4) with Global Positioning System (GPS) tracking systems and sensors that quantify harvest as the field is harvested, and recording data therefrom. For example, a combine has been fitted with load cells to weigh harvested grain as the grain is being transferred from the combine's threshing apparatus to the combine's grain storage bin. Other sensing technologies may also provide a measure of harvested grain. The system periodically records a trio of information in machine readable form, including groundspeed from a speedometer, coordinates from the GPS system, and harvested grain weight. The resulting data provides a yield map of the field, since yield is proportional to harvested grain weight divided by groundspeed. Where plant growth depends at least in part on agricultural attribute data, the yield map indirectly represents agricultural attribute data in the field and may indirectly represent variations in pH, particle size, moisture content, and nutrient content. Combines for harvesting peanut, rice, potato, sugar-beet, and other combines have been instrumented to generate yield maps. See U.S. Pat. No. 6,525,276 for a description of an instrumented combine, this patent being hereby incorporated by reference to the same extent as though fully replicated herein.

Figure 4:
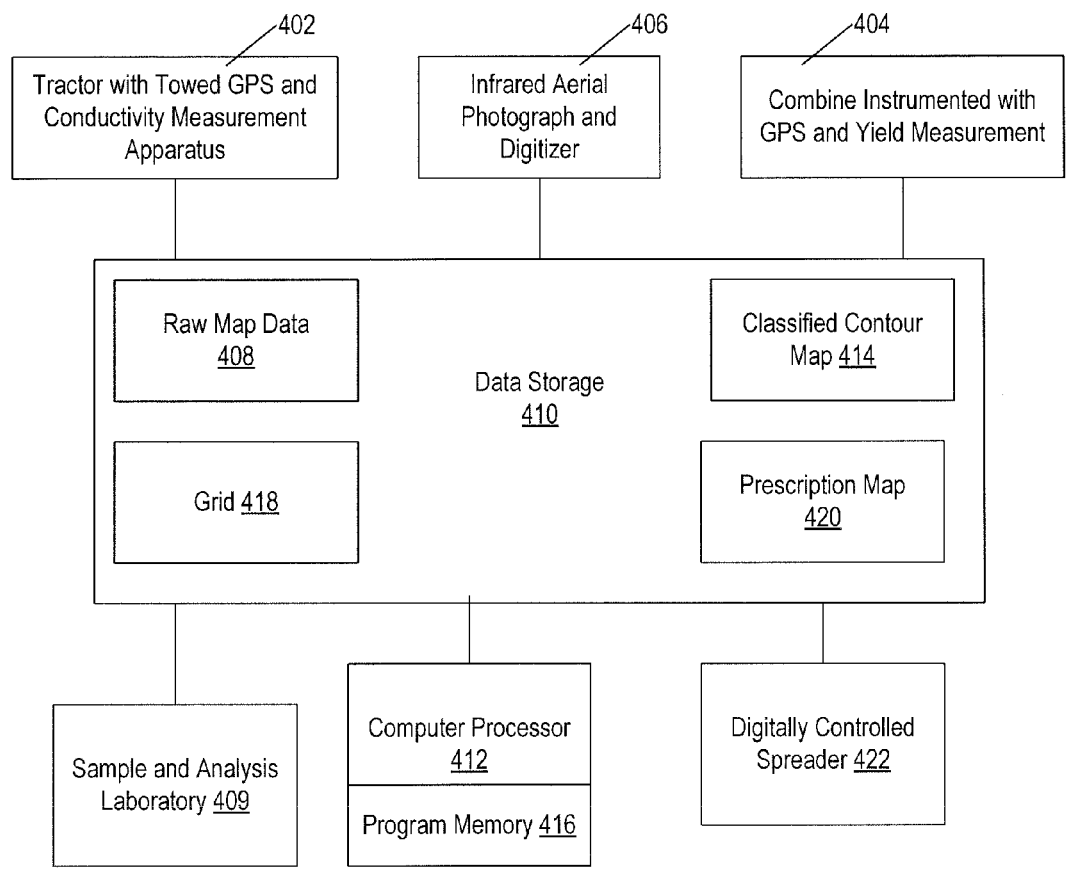
FIG. 4 is a block diagram of a system for determining a prescription for a field.

Thus, as shown in FIG. 4, the agricultural attribute data mapping information is transferred from the conductance measurement device 402, instrumented combine 404, or digital camera 406 to a data storage device 410 and stored as raw map data 408.

Processing the Map

Reading the Map

The raw map of agricultural attribute data is read or transferred into a computer processor 412 for further processing 310 (shown in FIG. 3). This processing eventually converts the data into a classified map 414, as represented by data stored in the data storage device to form map 100 indicating regions 130, 132, 152, 154, etc. . . . . The processor 412 operates under control of machine readable instructions for performing the method of FIG. 3 that are stored in a program memory 416.

The data is read into memory of the computer and windowed against field boundaries selecting for points within the field boundary 102 (shown in FIG. 1). The data is then normalized 312 on a grid 104 (shown in FIG. 1) having elements of a size appropriate for the size of the farmer's field. In an embodiment for fields having dimensions of a mile, a ten-by-ten foot grid element may be used. Other dimensions may be used for fields of other sizes. Where raw map data is available at coordinates more tightly spaced than grid points, this data is averaged to determine grid points. As shown in FIG. 1, a grid 104 divides the field intro grid elements, such as 112, 148, 162, 164. These grid elements may be any size and may be selected for size to accommodate agricultural equipment in use, such as being enlarged to accommodate a sixty foot combine, or shrunken to accommodate the needs of a particular crop or highly variable soil content. In practice, it is possible to store data in a grid format with elements sized to meet the smallest possible need. Values for these grid elements may be processed to aggregate the values, such as by an arithmetic or geometric average according to the natural distribution of the data, to make a grid of larger elements and so also avoid needless processing delays in applications where the grid would, otherwise, be unnecessarily small. The size of the grid may vary on an experiential basis depending upon farming practices, the type of crop, and/or the geographic location of the farm.

Soil electrical conductivity mapping data may have individual data points that are well outside the norm for that part of a field—for example where a sensing disk strikes a rock. Other mapping modalities may also have anomalies that do not represent agricultural attribute data, such as where infrared photography may show paths, farm equipment, center-pivot irrigators, irrigation canals, pumps, and pipes, people, animals, and scattered trees present in a field at the time a photograph is made. Outlier data points are delimited by determining data points that have data values distant from other data in their local region of the grid, and those outlier points are rejected 314 from the grid.

Any missing grid points are then interpolated 316 between nearby measured points. Alternatively, an empirical correlation may be used in the manner discussed above to assign values to grid elements in place of interpolation.

Next, a number of classes to be used for classifying the grid points is determined 318. In an embodiment, a number of classes is determined based upon the size of the farmer's field. The number of classes may vary on an experiential basis depending upon farming practices, the type of crop, and/or the geographic location of the farm. Any number of classes may be used; however, the complexity of the graphical presentation increases with the number of classes. In practice, it is found that a number of classes from 2 to 20 classes usually suffices, although large farms may require more as may farms with unusually nonhomogenous soil distributions. The instrumentalities described herein may often be practiced on from 2 to 10 classes, or even 3 to 5 classes, depending upon the specific application. In an alternative embodiment, a histogram of the data is inspected for any apparent peaks in the histogram, and a number of classes is determined such that each peak visible in the histogram can be assigned to a class. Optionally, a spatial filter may be run to avoid having small regions of difference on the map. For example, a program subroutine may calculate a total surface area for each group of geographically contiguous grid elements. These total surface areas may be stratified to identify groups with total surface areas below a delimiting value. The identified groups may then be placed into a different class according to the classification of surrounding groups of larger size, such as that of the largest or smallest adjoining group.

Optimizing the Map

Next, the computer runs a classification algorithm using, for example, a Jenks natural-breaks optimization 320 of the data, dividing the data into the determined number of data point classes. The Jenks optimization method is also known as the goodness of variance fit (GVF). It is used to minimize the squared deviations of the class means. Optimization is achieved when the quantity GVF is maximized. This is done by calculating the sum of squared deviations between classes (SDBC), then calculating the sum of squared deviations from the array mean (SDAM) and subtracting SDBC from SDAM. This quantity equals sum of the squared deviations from the class means (SDCM). As described in Jenks, George F. 1967. 'The *Data Model Concept in Statistical Mapping*', International Yearbook of Cartography 7: 186-190, which is hereby incorporated by reference to the same extent as though fully disclosed herein, the method first specifies an arbitrary grouping of the numeric data. SDAM is a constant and does not change unless the data changes. The mean of each class is computed and the SDCM is calculated. Observations are then moved from one class to another in an effort to reduce the sum of SDCM and therefore increase the GVF statistic. This process continues until the GVF value can no longer be increased.

Optimization 320 is performed by:
1. Initially assigning each class center-point to a value, these initial values in an embodiment are assigned evenly spaced between high and low values of the data. In an alternative embodiment these initial values are assigned equal to the value of each apparent peak in the histogram.
2. Determining initial breakpoints between classes. In an embodiment, the breakpoint is set midway between each class center-point value. An effective breakpoint is also set at the lowest remaining data value in the grid and at the highest data value in the grid; the total number of breakpoints is one more than the number of classes.
3. Computing a goodness value for the fit of the classification to the data in the map. In an embodiment, this is done by:
    a. Computing a mean of all data values lying in each class, values lying in a class determined by finding those values between the high and a low breakpoint for the class.
    b. Calculating a deviation by subtracting each value in the class from the mean of all data values lying in that class.
    c. Summing the squares of the deviations to determine a squared sum of deviations for the class.
    d. Summing the squared sum of variances for all classes.
4. Adjusting the breakpoint or breakpoints between two or more classes. In an embodiment this is done by adjusting breakpoints by gradually decreasing amounts of alternating sign.
5. Recomputing a goodness valued for the fit of the classification with adjusted breakpoints to the data in the map.
6. Selecting the breakpoints before, or after, adjustment according to the set of breakpoints that produced the lowest sum of the squared sum of deviations for all classes.
7. Iterating the steps of adjusting the breakpoint or breakpoints, computation of a goodness value, and selecting until an optimum set of breakpoints is found or a maximum number of iterations is reached.

The computer then determines 322 contour boundaries, such as line 150, between respective contiguous regions 132, 134 of grid elements assigned to each class. A map of these regions and contours, and a total of the areas of all regions of each class, is then stored in memory 410 as a contour map 414 and printed to be used as guidance for taking samples.

Prescribing the Agroproducts
Sampling the Field

Next, an application prescription is prepared 330 for each grid 418 point of each region of each class. This is done by first obtaining 332 samples in regions of each class. For example, these are the samples at locations 166, 168, 170, 172, 174, 176, 178 (shown in FIG. 1). Not all regions need be sampled, however at least one sample is preferably analyzed from at least one region of each class. GPS coordinates are recorded for each sample taken, such that each sample can be assigned to a particular nearest grid point in the grid. In an embodiment, at least one sample is obtained and analyzed on a distribution that is suitable to the application. For example, experience shows that it is frequently suitable to obtain one sample for each ten to fifteen acres that are assigned to regions of each class. The samples are analyzed in a laboratory 409 for pH, cation exchange capacity, phosphorous, and potassium and other nutrient content. Alternatively, sampling may entail taking plant tissue samples, insect counts, infrared readings, moisture content, or any other form of agricultural data.

Interpolating to Estimate Sample Analysis at Unsampled Points

The method used to estimate sample analysis at unsampled points necessarily depends on the number of samples taken from regions of that class. Grid points of regions of each class are interpolated 336 and assigned for that class separately from grid points of regions of other classes—each class is essentially treated as a field with holes, the holes representing regions classified into other classes. Missing values for a particular class may be provided to individual grid elements by interpolation of data from actual samples, or by use of a correlation that relates an indirect measurement to a value under study. This may be, for example, a least squares fit capable of projecting agricultural attribute data information on the basis of input data including past or analogous yield data, infrared data or soil electrical conductivity data. This data may be contoured to associate zones of the grid in a second classification according to a second type agricultural attribute data. One way to do this is by the use of a Kriging algorithm. Another option is to interpolate using nearest neighbor algorithm to interpolate among three points defining a plane.

Kriging

When many sampling points among the regions of a class are available, as would be expected if large fields of 640 acres or more are sampled at every 10-15 acres of regions in a class, it becomes possible to weight samples. Kriging identifies a set of geostatistical techniques in the family of linear least squares estimation algorithms. Kriging is used to interpolate the value of a random field (e.g., the pH of the landscape as a function of the geographic location) at an unobserved location using observations of pH values at nearby locations. With Kriging, the coefficients of an equation are determined such that an estimated pH or nutrient value at an estimated point (X,Y) is determined by a formula that uses multiple sample points, but is weighted such that sample analysis data points near the estimated point (X, Y) are more significant than sample analysis data points further from the estimated point. This process of using a fitted equation to represent the pH or nutrient value as an equation for estimating interpolated points, but where the fitted equation weights reference sample points by distance from the estimated points, is known herein as interpolating by Kriging by class. Kriging algorithms are commonly used in the field of geostatistics, for example, as described in Deutsch, C. V., and Journel, A. G. (1992), GSLIB—*Geostatistical Software Library and User's Guide*, Oxford University Press, New York, 338 pp. and Isaaks, E. H., and Srivastava, R. M. (1989), *An Introduction to Applied Geostatistics*, Oxford University Press, New York, 561 pp.

After samples from all classes are processed as heretofore discussed, an estimated or a measured value each agricultural attribute under study may be assigned to each point of the grid 418. The values may be printed as an interpolated estimated map. These values are compared to ideal values for the crop to be grown in the field and to recommended application rate tables for available agroproducts as known in the art to prescribe an agroproduct 338 at an application rate for each point in the grid. This formula and dosage information is stored as a prescription map 420 in memory 410. This may be presented, for example, on map 100 by adding color to the respective zones 140 142, 144, 146.

An application control map of the prescribed formulae and dosages is then generated 340 in a format suitable for controlling application of the application rate in each of the zones

140, 142, 144, 146. This may be determined according to standard practices known in the art, such as agricultural research brochures or articles with recommendations for application. These recommendations, for example, present an algorithm or table directing the application of X pounds of phosphate per acre when the soil contains Y parts per million phosphate. See for example K. Mengel, E. A. Kirby, *Principles of Plant Nutrition* pp. 593 International Potash. Institute, Berne, Switzerland. Common macronutrients that may be applied at rates known conventionally in the art include nitrogen, phosphorus, potassium, calcium, magnesium, and sulfur. Common micronutrients include iron, boron, manganese, sodium, zinc, copper, nickel, and molybdenum. Pesticides may be variably applied based upon the infestation rate of a particular pest. Lime may be used to control pH. Common fertilizers contain such materials as ammonia, lime, potash, potassium and/or ammonium nitrate, urea, pelletized sulfur, ammonium phosphate, potassium phosphate, and potassium chloride. These may be specially blended upon application to accommodate the needs of a particular application zone.

In an embodiment, the prescription is determined by treating each zone with a blanket application determined according to standard agricultural practices for the application of a agroproducts. As is also discussed above, information relating agricultural attributes to application rates for agroproducts to particular crops is a matter of convention in the art. For example, conventional guidance is published in Tri-State Fertilizer Recommendations for Corn, Soybeans, Wheat and Alfalfa Bulletin E-2567, which is hereby incorporated by reference to the same extent as though fully replicated herein.

It will be appreciated that plants avail themselves of the amended nutrients in a way that may be predictably related to increased yield. Thus, by applying nutrients costing P dollars, the increased yield at harvest is predictably Q dollars. By the foregoing instrumentalities it is possible to manage a field for optimization of profits, as opposed to yield. This may be done by maximizing the difference Q–P among an array of i possible options Pi, Qi where a budgetary cap is imposed as $\Sigma Pi$ and the object is to maximize the difference $\Sigma(Oi-Pi)$. This may be done using standard linear programming techniques, for example, as described in any of: Thomas H. Cormen, Charles E. Leiserson, Ronald L. Rivest, and Clifford Stein, *Introduction to Algorithms*, Second Edition. MIT Press and McGraw-Hill (2001), ISBN 0-262-03293-7 (Chapter 29: Linear Programming, pp. 770-821); Jalaluddin Abdullah, *Optimization by the Fixed-Point Method*, Version 1.97; or Alexander Schrijver, *Theory of Linear and Integer Programming*, John Wiley & sons, 1998, ISBN 0-471-98232-6. Thus, a user may provide input that identifies a plurality of agroproduct prescriptions under consideration for the management of particular nutrients in a field or on an entire farm Alternatively, the system may use a Monte-Carlo or other approach to generate a plurality of agroproduct prescription programs. The linear optimization technique selects for the best program from among those presented.

The application control map is then used by a numerically controlled fertilizer spreader 422 equipped for differential GPS-and-map controlled application rates. In an alternative embodiment, the map is printed and is used to operate manually-controlled application equipment to apply the appropriate amount of agroproduct to the soil in each region of the map. Specialized equipment for variable rate application may be purchased on commercial order, for example, as a variable rate applicator from Raven Industries of Sioux Falls, S. Dak.

While the forgoing has been particularly shown and described with reference to particular embodiments thereof, it will be understood by those skilled in the art that various other changes in the form and details may be made without departing from the spirit and scope hereof. It is to be understood that various changes may be made in adapting the description to different embodiments without departing from the broader concepts disclosed herein and comprehended by the claims that follow.

What is claimed is:

1. A method of applying agroproducts comprising:
    obtaining a first set of agricultural attribute data from a field;
    classifying by use of a computer a first set of agricultural attribute data using a Jenks Optimization to identify a plurality of discrete regions, each region having one or more contiguous special elements related by a commonality of class into a particular one a plurality of classes;
    obtaining a second set of agricultural attribute data from the field, the agricultural attribute data having at least one value obtained from each classification of the plurality of classes;
    identifying a subset of the second set of agricultural attribute data, different from the first set of agricultural attribute data, by associating the subset with a single class from among the plurality of classes;
    subclassifying by use of a computer the subset without regard to data obtained from other classes in the second set of agricultural attribute data to identify a plurality of application zones within the single class;
    determining an agroproduct prescription map for the plurality of application zones according to the needs of a crop that may be grown in the field; and
    applying at least one agroproduct to the field according to the prescription map.

2. The method of claim 1 wherein the step of classifying the first set of agricultural attribute data includes using at least two classifications.

3. The method of claim 1 wherein the step of classifying the first set of agricultural attribute data includes identifying a plurality of non contiguous discrete regions allocated to a particular class.

4. The method of claim 3 wherein the step of subclassifying includes interpolating by use of Kriging Interpolation based upon the analyzed values.

5. The method of claim 1 wherein the step of subclassifying includes interpolating by use of Kriging Interpolation based upon the analyzed values.

6. The method of claim 1 wherein the step of obtaining a second set of agricultural attribute data includes correlating by use of an empirically derived multivariate polynomial equation.

7. The method of claim 1, with selection of a second subset of the second agricultural attribute data and as to that second subset repeating the steps of
    identifying a subset of the second set of agricultural attribute data,
    subclassifying the subset without regard to data obtained from other classes,
    determining an agroproduct prescription map, and
    applying at least one agroproduct to the field.

8. A system for prescribing agroproducts comprising:
    means for obtaining a first set of agricultural attribute data from a field;
    means for classifying a first set of agricultural attribute data using a Jenks Optimization to identify a plurality of discrete regions, each region having one or more contiguous spatial elements related by commonality of class into a particular one a plurality of classes;

means for obtaining a second set of agricultural attribute data from the field, the agricultural attribute data having at least one value obtained from each classification of the plurality of classes;

means for identifying a subset of the second set of agricultural attribute data, different from the first set of agricultural attribute data, by associating the subset with a single class from among the plurality of classes;

means for subclassifying the subset without regard to data obtained from other classes in the second set of agricultural attribute data to identify a plurality of application zones within the single class;

means for determining an agroproduct prescription map for the plurality of application zones according to the needs of a crop that may be grown in the field.

9. The system of claim 8 wherein the means for classifying the first set of agricultural attribute data includes means for using at least two classifications.

10. The system of claim 8 wherein the means for classifying the first set of agricultural attribute data further compromises identifying a plurality of non contiguous discrete regions allocated to a particular class.

11. The system of claim 10 wherein the means for subclassifying interpolates by use of Kriging Interpolation based upon the analyzed values.

12. The system of claim 8 wherein the means for subclassifying includes program logic for interpolating by use of Kriging Interpolation based upon the analyzed values.

13. The system of claim 8 wherein the means for obtaining a second set of agricultural attribute data includes means for correlating by use of an empirically derived multivariate polynomial equation having coefficients fit to the analyzed values.

14. A system for prescribing agroproducts comprising:
a first set of agricultural attribute data obtained from a field;
a non-transitory computer readable medium containing machine-based program instructions for classifying a first set of agricultural attribute data using a Jenks Optimization to identify a plurality of discrete regions, each region having one or more contiguous spatial elements related by commonality of class into a particular one a plurality of classes;
a second set of agricultural attribute data obtained from the field, the agricultural attribute data having at least one value obtained from each classification of the plurality of classes;
the non-transitory computer based medium further containing machine-based program instructions for identifying a subset of the second set of agricultural attribute data, different from the first set of agricultural attribute data, by associating the subset with a single class from among the plurality of classes;
the non-transitory computer readable medium further containing machine-based program instructions for subclassifying the subset without regard to data obtained from other classes-s in the second set of agricultural attribute data to identify a plurality of application zones within the single class;
the non-transitory computer readable medium further containing machine-based program instructions for determining an agroproduct prescription map for the plurality of application zones according to the needs of a crop that may be grown in the field.

15. A machine-based method of prescribing agroproducts comprising:
obtaining a first set of agricultural attribute data from a field;
classifying by use of a computer programmed with a Jenks Optimization that operates upon a first set of agricultural attribute data to identify a plurality of discrete regions, each region having one or more contiguous spatial elements related by commonality of class into a particular one a plurality of classes;
obtaining a second set of agricultural attribute data from the field, the agricultural attribute data having at least one value obtained from each classification of the plurality of classes;
identifying a subset of the second set of agricultural attribute data, different from the first set of agricultural attribute data, by associating the subset with a single class from among the plurality of classes;
subclassifying by use of a computer the subset without regard to data obtained from other classes in the second set of agricultural attribute data to identify a plurality of application zones within the single class; and
determining an agroproduct prescription map for the plurality of application zones according to the needs of a crop that may be grown in the field.

16. A non-transitory computer readable form with program instructions operable to:
obtain a first set of agricultural attribute data from a field;
classify using a Jenks Optimization a first set of agricultural attribute data to identify a plurality of discrete regions, each region having one or more contiguous spatial elements related by commonality of class into a particular one a plurality of classes;
obtain a second set of agricultural attribute data from the field, the agricultural attribute data having at least one value obtained from each classification of the plurality of classes;
identify a subset of the second set of agricultural attribute data, different from the first set of agricultural attribute data, by associating the subset with a single class from among the plurality of classes;
subclassify the subset without regard to data obtained from other classes in the second set of agricultural attribute data to identify a plurality of application zones within the single class; and
determine an agroproduct prescription map for the plurality of application zones according to the needs of a crop that may be grown in the field.

* * * * *